O. L. ROOT AND C. BRAINARD.
AUTOMOBILE TRAFFIC SIGNAL.
APPLICATION FILED APR. 7, 1916.
1,332,575.
Patented Mar. 2, 1920.
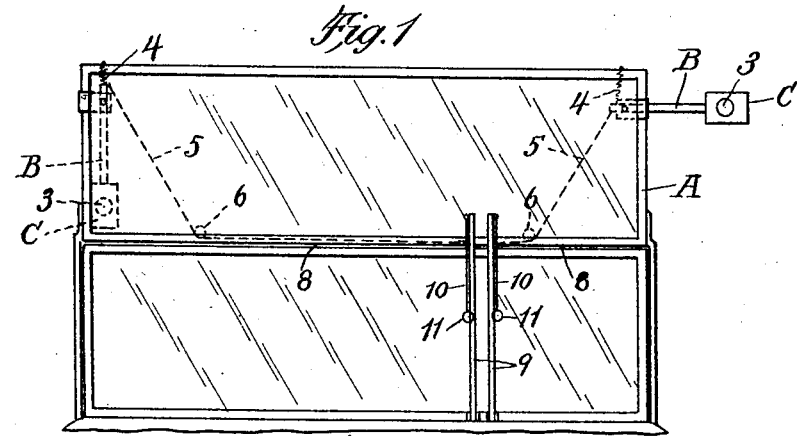
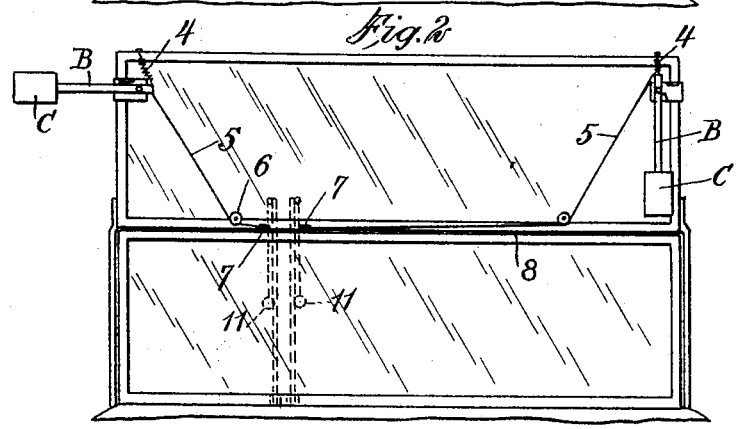
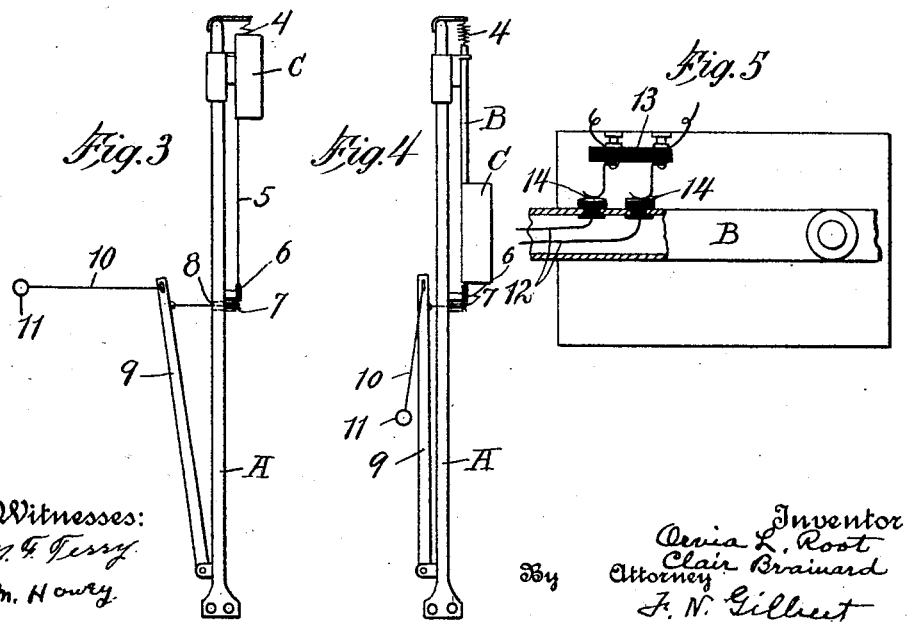

UNITED STATES PATENT OFFICE.

ORVIA L. ROOT AND CLAIR BRAINARD, OF BINGHAMTON, NEW YORK.

AUTOMOBILE TRAFFIC-SIGNAL.

1,332,575.  Specification of Letters Patent.  Patented Mar. 2, 1920.

Application filed April 7, 1916. Serial No. 89,665.

*To all whom it may concern:*

Be it known that we, ORVIA L. ROOT and CLAIR BRAINARD, citizens of the United States, residing at Binghamton, in the county of Broome and State of New York, have invented certain new and useful Improvements in Automobile Traffic-Signals, of which the following is a specification.

Our invention relates to an improvement in automobile traffic signals in which a colored signal arm may be automatically displayed on either side of the front of the automobile by night and it has for its object to provide a means for signaling which way the automobile is about to turn off from a highway or street on which it is passing.

With this object in view our invention consists in certain novel features of construction and arrangement of parts as is more clearly pointed out in the claim hereinafter set forth, reference being had to the accompanying drawings in which Figure 1 is a front elevation in perspective of our device as attached to the wind shield of an automobile with signal displayed on one side of the automobile.

Fig. 2 is a rear view of a front elevation in perspective of our device as attached to the wind shield of an automobile with signal displayed on one side.

Fig. 3 is a side view in perspective of our device as mounted on a wind shield of an automobile with signal arm displayed on one side.

Fig. 4 is a side elevation of our device in perspective as mounted on a wind shield of an automobile with signal arm lowered.

Fig. 5 is a front view partly in cross section of a fragmentary part of our device.

The same reference characters denote like parts in each of the several figures of the drawings.

In carrying out our invention we have the wind shield or frame of the automobile body A. Pivoted in any convenient manner on the right and left hand of the frame of this wind shield we have the arms B and B. On the ends of these signal arms we have the signal board C colored in any convenient manner for giving signal by day. In the center of the signal board C we have the opening 3 in which we have an electric bulb. At the inner end of the signal arm B we have the cord 5 attached and also there is attached to this inner end a spiral spring 4. The cord 5 passes over the pulleys 6. 6; thence over the pulleys 7. 7 and through openings 8. 8. The wind shield is then fastened to the vertical lever 9 and to the end of which lever 9 we have the cord 10 and to which is attached the ring 11.

In Fig. 3 A represents the wind shield; B the signal arm; C the signal board and 5 the cord passing over pulley 6; thence over pulley 7; thence through the opening in the wind shield and is fastened to the vertical lever 9 which is pivotally mounted on the wind shield A. On levers 9. 9 we have the cord 10 with ring 11 attached to the same. Passing through the center of the signal arm B we have an electric wire connection 12. 12 which passes in to the signal board or plane 3 and mounted on arm B we have the switch 13 so that when the arm B is raised to a vertical position it contacts with the switch connection at 13 thus producing a light at night, when the signal arm B makes the switch connection at 14. 14 by the arm B being raised in a vertical position and forming an electrical contact at the switch. The electric light mounting is similar in both the right and left signal boards.

In the operation of our device when we wish to give a signal that the automobile is to turn to the right we pull on cord 10 or ring 11 attached to lever 9; which draws on lever 9; which pulls on cord 5, passing over pulleys 6 and 7 and finally draws on signal arm B which arm pivoted turns upon this pivot until it assumes the horizontal position shown in Fig. 1 and Fig. 2. When we wish to turn to the left we pull on the other ring and cord which is attached to lever 9; which draws on cord 5, passing over pulleys 6 and 7 until it reaches the end of signal arm B and draws it down until it is in a horizontal position. The spiral springs 4. 4 so draw upon the signal arm B as to keep it in a vertical position when not in use so that when we let loose of ring 10 pulling on cord 10 and 5 which draws out the springs 4. 4; the recoil of the springs 4. 4 causing arm to fly upward and resume its vertical position as shown in Fig. 3 and Fig. 4. The same movement results from the same operation, when we release the opposite ring 11 and cord 10 causing the signal arm B drawn up by the spiral recoil of spiral spring 4 and said arm flies back into its vertical position and draws back upon the vertical lever 9 by means of cord 10 by means of cord 5. At the same time the contact of the electric switch causes the lighting bulb 3 to be lighted.

Having thus described our invention, what we claim as new, and for which we desire Letters Patent is as follows:

A device of the class described, comprising a signal arm pivotally mounted on the outer face of a wind shield at an upper corner thereof, an operating lever pivotally mounted on the inner surface of the wind shield at the lower portion thereof, said operating lever being movable in a plane at an angle to the plane of movement of the signal arm, a flexible connection between the signal arm and the operating lever, and guides on the wind shield for guiding the flexible connection from the operating lever to the signal arm, said guides being so disposed as to direct the flexible connection to one side of the wind shield, whereby the visibility through the wind shield is unimpaired.

In testimony whereof we have affixed our signatures in presence of two witnesses.

ORVIA L. ROOT.
CLAIR BRAINARD.

Witnesses:
E. A. JOYNER,
E. M. HOWE.